United States Patent [19]

Goodwin

[11] 4,350,732

[45] Sep. 21, 1982

[54] REINFORCING LAMINATE

[75] Inventor: Robert F. Goodwin, Georgetown, Mass.

[73] Assignee: Foss Manufacturing Company, Inc., Mass.

[21] Appl. No.: 247,387

[22] Filed: Mar. 25, 1981

Related U.S. Application Data

[63] Continuation of Ser. No. 88,656, Oct. 26, 1976, abandoned.

[51] Int. Cl.$^3$ .............................................. F16G 1/00
[52] U.S. Cl. .................................. 428/246; 428/249; 428/252; 428/286
[58] Field of Search ............... 428/246, 248, 249, 251, 428/252, 261, 284, 285, 286, 287, 346, 347, 349; 36/68

[56] References Cited

U.S. PATENT DOCUMENTS

| | | | |
|---|---|---|---|
| 2,734,289 | 2/1956 | Heaton et al. | 36/68 |
| 3,113,906 | 12/1963 | Hamilton | 36/68 |
| 3,427,733 | 2/1969 | Beckwith | 36/68 |
| 4,046,933 | 9/1977 | Stefanik | 428/246 |
| 4,084,863 | 4/1978 | Capelli | 428/246 |
| 4,109,543 | 8/1978 | Foti | 428/246 |

Primary Examiner—William J. Van Balen
Attorney, Agent, or Firm—Jerry Cohen

[57] ABSTRACT

A stiff reinforcing laminate which is moldable into complex, compound curve shapes and bondable to a carrier surface to be reinforced to provide a tough, water-resistant reinforcement, usable for instance in outdoorsmen's or military boots as counter or box toe reinforcement element, comprises a tough core layer of thermoplastic resin and at least one strength layer of saturated fabric, the saturant being a solvent or heat activatable adhesive, the fibers of the saturated fabric layer being in part geometrically locked into the tough thermoplastic resin layer.

11 Claims, 1 Drawing Figure

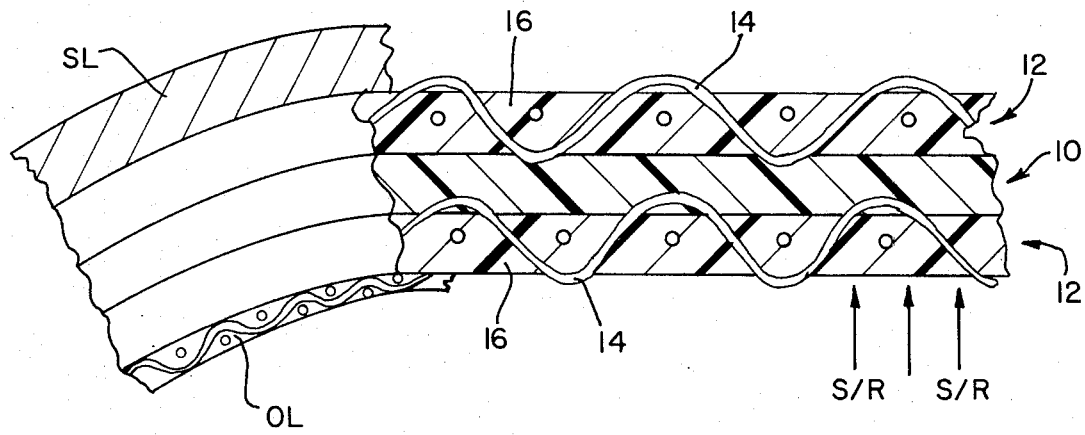

4,350,732

REINFORCING LAMINATE

This application is a continuation of application Ser. No. 88,656, filed Oct. 26, 1976, now abandoned.

BACKGROUND OF THE INVENTION

The present invention relates to reinforcement, particularly in connection with reinforcing elements for shoes and more particularly military and outdoorsmen's boots subject to rugged long-term use, water, oil and weather exposure.

In such boot or related application, the use of external adhesives is undesirable because (a) long-term usage tends to degrade such external adhesives, (b) slow, costly processing is entailed with latex adhesives, (c) critical time/temp/pressure relationships are often required, and (d) residual thermosensitivity of hot melt adhesives is a further handicap. The requirement is not completely met by ionic resin stiffening elements as described in U.S. Pat. No. 3,427,733 to Beckwith. Older more traditional materials such as the polyethylene reinforced fabric of U.S. Pat. No. 2,734,289 to Heaton et al., as well as cardboard or rubber, have also proven inadequate.

It is an important object of the present invention to provide moldable, stiff reinforcement which is water, oil, impact and weather resistant.

It is a further object of the invention to provide such a reinforcement which is self-adherent to a carrier surface to be reinforced thereby.

It is a further object of the invention to provide such a reinforcement of laminate form with the ability to process at high production rate and utilize inexpensive components.

It is a further object of the invention to provide such reinforcement affording a toughness, impact-resistance and stiffness, consistent with one or more of the preceding objects.

SUMMARY OF THE INVENTION

In accordance with the invention, cloth is laminated with a tough ionomeric or polymeric resin layer and then saturated with a solvent- or heat-activatable adhesive and stiffening material, preferably styrene, which is activatable by aromatic solvents (or through heat activation), in accordance with per se conventional technology of the footwear materials industry. Preferably two such fabric layers are bonded to a freshly extruded resin layer to sandwich it as drawn from an extruder. The preliminary laminate thus formed is then caused to be saturated in its fabric layer(s) with a solvent- or heat-activatable adhesive impregnant to produce a final laminate. The final laminate thus formed can be shipped in rolls and spread and cut to desired forms by users for molding and adhesively bonding to a supporting substrate and (optionally) overlapping with a cover or liner, also by adhesive bonding. The adhesion is afforded by preliminarily solvent- or heat-activating (preferably solvent-activating) at least one of the impregnant layers prior to pressure and heat activation of the laminate in the course of molding.

The fabric provides exposed fibrous ends which can adequately bond to freshly extruded core resin and penetrate therewithin for geometric locking between the fabric and such core resin to adhere the fabric layer to the resin before and after impregnating the fabric.

The tough resin layer is preferably a thermoplastic hydrocarbon resin derived from olefin monomer described in U.S. Pat. No. 3,427,733 of Feb. 18, 1979 to Beckwith describing a lamiante of such resin with fabric affording unique advantages in a stiffening element). Such material, an "ionomeric resin" incorporating therein ionic bonds in a thermoplastic polymer resin, may be more fully described as an ionic copolymer selected from the class consisting of polymers of α-olefins having the general formula $RCH=CH_2$ where R is a radical selected from the class consisting of hydrogen and alkyl radicals having from 1 to 8 carbons atoms, the olefin content of the polymer being at least 50 mol percent, based on the polymer, and an $\alpha,\beta$-ethylenically unsaturated monocarboxylic acid, the acid monomer content of the polymer being from 0.2 to 25 mol percent, based on the polymer, the monomer-carboxylic acid polymer containing uniformly distributed through the polymer a metal ion having a valence of 1 to 3 inclusive, and polymers of said olefin content and a $\alpha,\beta$-ethylenically unsaturated dicarboxylic acid, the acid content of the polymer being from 0.2 to 25 mol percent based on the polymer, the dicarboxylic acid copolymer containing uniformly distributed throughout the polymer a monovalent metal ion, in which at least 10 percent of the carboxylic acid groups of the monovalent and divalent carboxylic acid polymers are neutralized by the metal ions.

Other usable core layers in lieu of the above described ionomeric resin include polyethylene, polypropylene, ethylene-vinyl-acetate, ethylene-ethyl-acrylate, acrylonitrile-butadiene-styrene, and various formulated blends of the above, all the foregoing in thicknesses ranging from 0.010–0.050 inches. Such materials in such thicknesses would normally be inadequate, per se or as laminated to cloth layers for modern standards of box and toe counter usage in most modern applications, particularly military boot usage but can be provided in improved and acceptable form in more applications through the usage in accordance with the present invention.

As used in the present invention, the ionomeric core layer is provided in thicknesses of 0.010 to 0.050 inches, some ½–⅔ of the thicknesses of such resin is employed in the context of practical commercial use (0.025 inches and higher) of the invention recited in the said Beckwith patent. Similar reductions of thickness can be made in equivalent fashion when using the other core materials.

Each cloth may comprise woven, nonwoven, spunbonded, spunlaced, stitchbonded, melt-bonded, chemically bonded and needled layers of cotton, rayon, nylon, polyester, polypropylene and blends of the above. Weight ranges from 1 oz./yd.$^2$–8 oz./yd$^2$. The impregnant may be polystyrene per se which may comprise as copolymerized components therewith, butadienes, acrylonitriles, acrylates, or copolymers of the foregoing.

Styrene-butadiene, styrene-acrylonitrile, styrene-acrylate, acrylonitrile-butadiene, polyvinyl acetate and polyvinyl alcohol saturated fabrics are per se known as reinforcing materials for shoe counters and box toes. Preferably 100% polystyrene or a 90–10% (by weight) polystyrene-butadiene copolymer is employed. Polystyrene is activatable in aromatic solvents. Preferably one of toluene, methyl ethyl ketone, methylene chloride or 1, 1, 1 trichloroethane is utilized. The activation may be effected by surface coating the polystyrene with solvent or dipping the polystyrene layer (and any other layer laminated thereto) into the solvent. Heat activation may be used in lieu of solvent activation for polystyrene or other fabric saturants. As used herein, "heat activation" includes radiation as well as conductive, corrective, radiant and external heating and chemical internal heating.

Other objects, features and advantages of the invention will be apparent from the following detailed description of preferred embodiments thereof taken in connection with the accompanying drawing.

BRIEF DESCRIPTION OF THE DRAWING

The single FIGURE of which is a cross-section, higher schematic view of a reinforcing laminate made in accordance with a preferred embodiment of the invention.

DETAILED DESCRIPTION OF PREFERRED EMBODIMENTS

A preferred laminate of the invention comprises a core 10 of ionomeric resin as described above sandwiched between saturated fabric layers 12, each of which comprises a non-woven or woven fabric 14. The ionomeric resin layer is produced as described in the above Rees patent and extruded as mentioned in the Beckwith patent. The fabric layers are applied in contact to the ionomeric resin layer to form as initial laminate. Then the assemblage is passed through waterbase latex styrene to form a final laminate. Optionally the final laminate product may be post calendared with a high pressure roller at room or elevated temperature.

There are exposed ends of the fabric 14 which lock into the ionomeric resin layer and enhance bonding generally between such layer and the fabric 14 per se and ultimately with layers 12. The laminate so produced can be rolled up for shipping, cut to desired shapes such as for counters, box toe blanks and the like and prepared for molding by the user by solvent activating or heat activating the saturant of the saturated fabric layer, the application of solvent or heat being indicated by the arrows S/R. In the case of polystyrene, the dipping of the laminate as a whole in aromatic solvents causes substantial softening of the saturant causing in turn particularly desirable molding properties as well as adhesive properties. The cut-to-shape laminate portion as a whole can be heated and pressed in the molding apparatus for further softening to enable molding the laminate as a whole to a desired shape, and to effect adhesive bonding of the layer to a substrate layer SL and/or to an overlayer OL via the impregnants. The steps of substrate and/or liner adhesive bonding can be made simultaneously with the molding of the laminate or promptly thereafter a separate step while the adhesive activity is high.

The resulting reinforcing element or reinforcing element/carrier combination (e.g., a military boot component) can afford a long, reliable service life with greater resistance to extreme conditions of weathering, oil exposure and heavy usage, particularly overcoming the problem of moisture vulnerability and impact resistance which has been a weakness of state of the art products.

The solvent activation, per se, can be done at room temperature and followed up by drying period that can be controlled to be fast or slow depending upon solvent selection and product density. The polystyrene/fabric layers exhibit high stiffness and adhesive properties while the necessary toughness in the context of such laminate usage is provided by the ionomeric resin core. The combination as a whole avoids the use of hot melt adhesives for bonding the reinforcement to a substrate—the bonding being effected substantially solely through the adhesive styrene, utilizes less styrene than in conventional styrene/fabric reinforcements, eliminates heat and moisture sensitivity through elimination of hot melt adhesives, allows use of less ionomeric resin or other resin than in conventional resin reinforcements and on the whole provides better bonding between integral parts of the reinforced (and optionally overlaid with a liner) substrate combination than in conventional combinations of such type and within the reinforcement, per se.

The combination further allows a faster shoe-making process because the toes are held firm by the plastic core while the activated styrene adhesive layer is "setting". This means that subsequent shoe-making steps can proceed more rapidly than with conventional styrene toes which must be allowed to age until firmness had developed.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the the apparatus and techniques herein disclosed and limited solely by the scope and spirit of the appended claims.

What is claimed is:

1. A stiff laminate, which is moldable and simultaneously bondable to a substrate surface for purposes of reinforcement or the like, comprising, at least one layer of tough resin, at least one solvent- or heat-activatable adhesive impregnated cloth layer, the layers being bonded to each other at least in part through locking of cloth fiber portions of the latter layer into the adjacent resin layer, the adhesive impregnant comprising a styrene saturant which is capable of impregnation into the fibrous layer in liquid form and hardenable therein to form a stiff solid layer.

2. A stiff laminate, which is moldable and simultaneously bondable to a substrate surface for purposes of reinforcement or the like, comprising, at least one layer of tough thermo-plastic resin, at least one solvent- or heat-activatable adhesive impregnated cloth layer, the layers being bonded to each other at least in part through locking of cloth fiber portions of the latter layer into the adjacent resin layer, and wherein the thermoplastic resin is an ionic copolymer of a monomer feed comprising as at least 50 mol percent thereof an $\alpha$-olefin having the general formula $RCH=CH_2$ where R is selected from the class consisting of hydrogen and 1–8 carbon atom alkyl radicals; as 0.2 to 25 mol percent thereof an $\alpha,\beta$-ethylenically unsaturated monocarboxylic acid; and as 0.2 to 25 mol percent thereof an $\alpha,\beta$-ethylenically unsaturated dicarboxylic acid, the copolymers having at least a uniformly distributed 10 percent of the carboxylic acid group of mono- and di-carboxylic acid therein neutralized by metal ions of 1–3 valence.

3. The product of claim 2 wherein the resin layer is sandwiched by two such impregnated cloth layers bonded thereto.

4. The product of claim 3 in combination with adjacent substrate and cover layer on two sides thereof adhesively bonded thereto substantially solely via said impregnated layers.

5. The product of claim 2 in combination with a substrate adjacent thereto and adhesively bonded thereto substantially solely via said impregnated layers.

6. The product of claim 5 as made by molding the laminate under conditions to simultaneously soften at least the impregnant of the impregnated layer and activate its adhesive properties and adhering it to the substrate while activated.

7. Process of bonding the product of claim 6 comprising aromatic solvent activation of the styrene.

8. Process in accordance with claim 7 wherein the solvent is selected from the class consisting of toluene, methyl-ethyl-ketone, methylene chloride, 1.1.1 trichloroethane.

9. The product of either of claim 2 or 3 or 1 as made by extruding a thermoplastic resin to form said resin layer, adhering said cloth layer(s) substantially free of impregnation material to the resin layer as freshly extruded to form a preliminary laminate, subsequently contacting the preliminary laminate with said solvent—or heat—activatable adhesive to impregnate the cloth layer(s) thereof with said adhesive, whereby a final laminate is thus formed which is storable, but at any time ready for activation and molding and bonding to a substrate and/or cover layer, substantially without use of hot melt adhesive additives or other external adhesives.

10. The product of claim 9 wherein the resin layer has a thickness of 0.010 to 0.050 inches.

11. Process for making molded products comprising solvent treating the adhesive layer of the claim 9 final laminate product and then molding it under heat and pressure in contact with a substrate, the adhesive of the final laminate contacting the substrate.

* * * * *

UNITED STATES PATENT AND TRADEMARK OFFICE
CERTIFICATE OF CORRECTION

PATENT NO. : 4,350,732

DATED : September 21, 1982

INVENTOR(S) : Robert F. Goodwin

It is certified that error appears in the above-identified patent and that said Letters Patent is hereby corrected as shown below:

On the Title Page, "[63] Continuation of Serial No. 88,656, October 26, 1976, abandoned." Should read -- [63] Continuation of Serial No. 88,656, October 26, 1979, abandoned.

Column 1, line 5, "filed October 26, 1976," should read -- filed October 26, 1979, --

Column 3, line 5, "corrective" should be -- convective --

*Signed and Sealed this*

*Fourteenth* Day of *May 1985*

[SEAL]

*Attest:*

DONALD J. QUIGG

*Attesting Officer*   *Acting Commissioner of Patents and Trademarks*